United States Patent Office 3,310,677
Patented Mar. 21, 1967

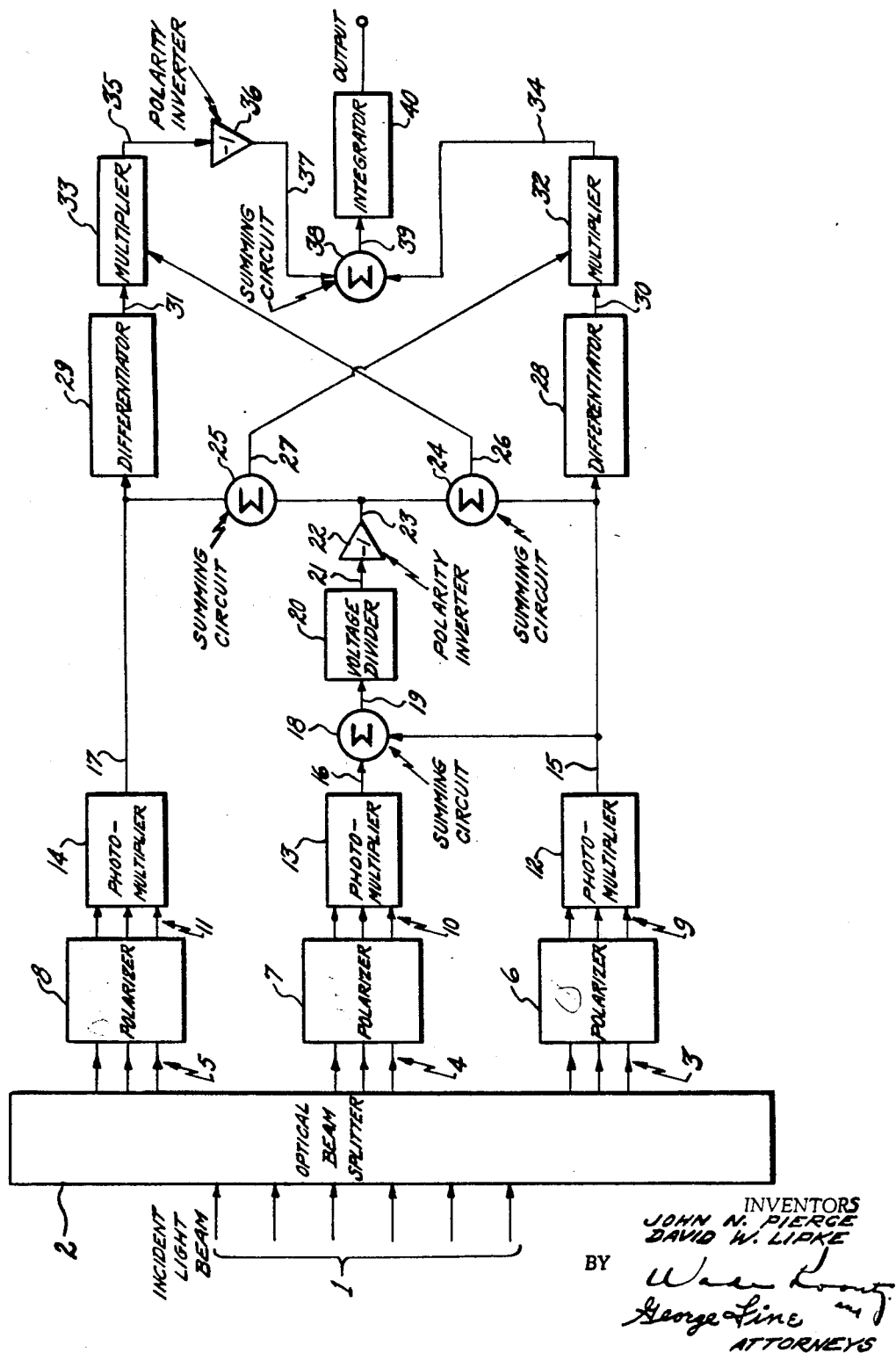

3,310,677
OPTICAL POLARIZATION DEMODULATOR
SYSTEM
John N. Pierce, Lexington, Mass., and David W. Lipke,
West Hyattsville, Md., assignors to the United States of
America as represented by the Secretary of the Air
Force
Filed Aug. 4, 1964, Ser. No. 387,532
3 Claims. (Cl. 250—199)

The invention described herein may be manufactured and used by or for the United States Government for governmental purposes without payment to us of any royalty thereon.

This invention relates to a system for demodulating polarized signals, and more particularly to a system which combines derivatives of trigonometric functions of the angle of the plane of polarization with the functions themselves to arrive at the derivative of the modulating function, and which by integration then determines the modulating function itself.

The system of the present invention demodulates a signal which has been used to modulate a light beam by varying the plane of polarization of the light. The angle through which the plane of polarization is rotated is linearly proportional to the amplitude of the modulating signal. The present system permits demodulation even if the plane of polarization of the transmitted light undergoes many revolutions in the course of modulation thereof, and even if the intensity of the light is unknown. Furthermore, this invention accomplishes this result with only the simplest of electronic components and without the need for elaborate and costly magnetic, electrostatic or optical components.

An object of the present invention is to provide a system for demodulating a signal which has been utilized to modulate a light beam by varying the plane of polarization of the light.

Another object of the present invention is to provide a system for demodulating a light beam even if the plane of polarization of the transmitted light undergoes many revolutions in the course of modulation.

Yet another object of the present invention is to detect the modulation imposed upon a light beam.

Still another object of the present invention is to provide a system which demodulates polarization-modulated light.

The various features of novelty which characterize this invention are pointed out with particularity in the claims annexed to and forming part of this specification. For a better understanding of the invention, however, its advantages and specific objects obtained with its use, reference should be had to the accompanying drawing and descriptive matter in which is illustrated and described a preferred embodiment of the invention.

In the single drawing of the present invention, there is shown incoming information modulated incident light which is plane polarized at any instant of time with a horizontal electric field component $E_x = E \cos [x(t) - x_0]$ where $x(t)$ is the modulating function and $x_0$ is a fixed angle unknown to the receiver, and a vertical component $E_y = E \sin [x(t) - x_0]$. Optical beam splitter 2 may be a simple lens system which is conventional or a combination of beam splitters comprising half-silvered mirrors. Incident light 1 is split into three light beams 3, 4 and 5 by way of beam splitter 2 and are of equal intensity and have the same ratio of horizontal component to vertical component as incident light 1. Polarization filters 6, 7 and 8 pass light beams 3, 4 and 5, respectively. These polarization filters are conventional and are commercially available from Polaroid Co. The axis of maximum transmission (AMT) of polarizer 6 is at some angle $\theta$ with respect to the horizontal. The axis of maximum transmission of polarizer 7 is at an angle $\theta + 90°$ with respect to the horizontal. The axis of maximum transmission of polarizer 8 is at some angle $\phi$ with respect to the horizontal. The angle $\phi$ must not be equal to either $\theta$ or $\theta + 90°$. The best value for $\phi$ is $\theta + 45°$. The peak field intensity (PFI) of transmitted light 9 is $$E_{\max.\ 9} = aE \cos [x(t) - x_0 - \theta]$$

the PFI of transmitted light 10 is $$E_{\max.\ 10} = aE \cos [x(t) - x_0 - \theta - 90°]$$

and the PFI of transmitted light 11 is $$E_{\max.\ 11} = aE \cos [x(t) - x_0 - \phi]$$

The constant $a$ is an unknown number which includes the efficiency of the beam splitting and of the polarizers.

Photomultiplier tubes 12, 13 and 14 are conventional and produce an electrical output proportional to the power of the light incident upon them, and hence proportional to the square of the field intensity. Tubes 12, 13 and 14 recieve light beams 9, 10 and 11 and provide electrical outputs 15, 16 and 17, respectively. Thus, the signal 15 is given by $$l_{15} = b \cos^2 [x(t) - x_0 - \theta]$$
$$= \frac{b}{2} + \frac{b}{2} \cos [2x(t) - 2x_0 - 2\theta]$$

signal 16 is given by $$l_{16} = b \cos^2 [x(t) - x_0 - \theta - 90°]$$
$$l_{16} = \frac{b}{2} - \frac{b}{2} \cos [2x(t) - 2x_0 - 2\theta]$$

signal 17 is given by $$l_{17} = b \cos^2 [x(t) - x_0 - \phi]$$
$$= \frac{b}{2} + \frac{b}{2} \cos [2x(t) - 2x_0 - 2\phi]$$

The constant $b$ in these three expressions is unknown and depends on $a$, $E$, and the properties of photomultiplier tubes 12, 13 and 14.

Summing circuits 18, 24, 25 and 38; voltage divider 20; polarity inverters 22 and 36; multipliers 32 and 33; differentiators 28 and 29; and integrator 40 are all conventional. Voltage divider 20 divides by one-half. Polarity inverters 22 and 36 have a gain of one. Differentiators 28 and 29 and integrator 40 need only look like differentiators and integrators, respectively, over a bandwidth a few times as large as the bandwidth of the modulation $x(t)$ and as such are easily constructed. Signals 15 and 16 are passed through summing circuit 18 and signal 19 is obtained which is given by $$l_{19} = l_{15} + l_{16} = b$$

Signal 19 is passed through voltage divider 20 and provides thereby signal 21 which is given by $$l_{21} \frac{1}{2} l_{19} = \frac{b}{2}$$

Signal 21 is passed through polarity inverter 22 and provides signal 23 which is given by $$l_{23} = -l_{21} = -\frac{b}{2}$$

Signals 15 and 23 are passed through summing network 24 and provides signal 27 which is given by $$l_{26} = l_{15} + l_{23}$$
$$= \frac{b}{2} \cos [2x_0 + 2\theta - 2x(t)]$$

Signals 17 and 23 are passed through summing circuit 25 and provides signal 27 which is given by $$l_{27} = l_{17} + l_{23}$$
$$= \frac{b}{2} \cos [2x_0 + 2\phi - 2x(t)]$$

Signals 15 and 17 are passed through differentiators 28 and 29 to provide signals 30 and 31, respectively. Signals 30 and 31, respectively, are given by $$l_{30} = \frac{d}{dt} l_{15} = bx'(t) \sin [2x_0 + 2\theta - 2x(t)]$$

$$l_{31} = \frac{d}{dt} l_{17} = bx'(t) \sin [2x_0 + 2\phi - 2x(t)]$$

where the prime indicates the derivative.

Multiplication of signals 27 and 30 is performed by multiplier 32 to provide signal 34 which is given by $$l_{34} = l_{27} \cdot l_{30}$$
$$= \frac{b^2}{2} x'(t) \cos [2x_0 + 2\phi - 2x(t)] \sin [2x_0 + 2\theta - 2x(t)]$$

Multiplication of signals 26 and 31 is performed by multiplier 33 to provide signal 35 which is given by $$l_{35} = l_{26} \cdot l_{31}$$
$$= \frac{b^2}{2} x'(t) \cos [2x_0 + 2\theta - 2x(t)] \sin [2x_0 + 2\phi - 2x(t)]$$

Signal 35 is passed through polarity inverter 36 to provide signal 37 which is given by $$l_{37} = -l_{35} = -\frac{b^2}{2} x'(t) \cos [2x_0 + 2\theta - 2x(t)] \sin [2x_0 + 2\phi - 2x(t)]$$

Signals 34 and 37 are added in summing circuit 38 to provide signal 39 which is given by $$l_{39} = l_{34} + l_{37} = \frac{b^2}{2} x'(t) \sin [2\theta - 2\phi]$$

Signal 39 is passed through integrator 40 and provides demodulated output signal 41 which is given by $$l_{41} = \int_t l_{39} \, dt = \frac{b^2}{2} x(t) \sin [2\theta - 2\phi] + c$$

where $c$ is a constant determined by the initial voltage at the integrator output.

If the field intensity, E, of the incident light is sufficiently steady, the voltage of output signal 23 of polarity inverter 22 need only be found once at the beginning of reception and set to remain at that voltage thereafter. If this is the case, photomultiplier tube 14 could be used in place of photomultiplier tube 13 during the initial adjustment, by setting polarizer 8 at the appropriate angle. After the setting of the voltage of signal 23 at the output of polarity inverter 22 was accomplished, photomultiplier tube 14 could be connected back as shown in the single drawing, and polarizer 8 returned to the desired angle. This method operation, when suitable, would allow the use of only two photomultipliers and two polarizers.

Thus, there is provided by the present invention a system which demodulates polarization-modulated light, which uses only standard electronic components and photosensitive devices which are sensitive only to the power of the light incident upon them, which combines derivatives of trigonometric functions of the angle of the plane of polarization with the functions themselves to arrive at the derivative of the modulating function, and which by integration then determines the modulating function itself. This is accomplished in a manner such that it is unnecessary to know beforehand the intensity of the light and in a manner such that the plane of polarization may be rotated through more than one cycle and still be detected.

What is claimed is:

1. A system for demodulating light modulated by variation of the plane of polarization thereof comprising means to split said modulated light into three light beams, a first polarizer passing one of said three light beams, said first polarizer having an axis of maximum transmission at a preselected angle $\theta$ with respect to the horizontal, a second polarizer passing the second of said three light beams, said second polarizer being at an angle $\theta$ plus 90° with respect to said horizontal, a third polarizer passing the third of said light beams, said third polarizer having an axis of maximum transmission at a preselected angle $\phi$ with respect to said horizontal, first, second and third photomultipliers converting said first, second and third light beams passed by said first, second and third polarizers to first, second and third representative electrical signals, respectively, first means to sum said first and second electrical signals to provide a first summed signal, means to divide said first summed signal, means to invert the polarity of said divided signal, second means to sum said first electrical signal and said inverted signal to provide a second summed signal, third means to sum said third electrical signal and said inverted signal to provide a third summed signal, first and second means to differentiate said first and third electrical signals, respectively, a first multiplier receiving said first differentiated signal and said third summed signal to provide a first product signal, a second multiplier receiving said second differentiated signal and said second summed signal to provide a second product signal, means to invert the polarity of said second product signal, fourth means to sum said first product signal and said inverted second product signal to provide a fourth summed signal and means to integrate said fourth summed signal to provide a demodulated output signal.

2. A system for demodulating light modulated by variation of the plane of polarization thereof comprising means to split said modulated light into three light beams, a first polarizer passing one of said three light beams, said first polarizer having an axis of maximum transmission at a preselected angle $\theta$ with respect to the horizontal, a second polarizer passing the second of said three light beams, said second polarizer being at an angle $\theta$ plus 90° with respect to said horizontal, a third polarizer passing the third of said light beams, said third polarizer having an axis of maximum transmission at an angle $\phi$ equal $\theta$ plus 45° with respect to said horizontal, first, second and third photomultipliers converting said first, second and third light beams passed by said first, second and third polarizers to first, second and third representative electrical signals, respectively, first means to sum said first and second electrical signals to provide a first summed signal, means to divide by one half said first summed signal, means to invert the polarity of said divided signal, second means to sum said first electrical signal and said inverted signal to provide a second summed signal, third means to sum said third electrical signal and said inverted signal to provide a third summed signal, first and second means to differentiate said first and third electrical signals, respectively, a first multiplier receiving said first differentiated signal and said third summed signal to provide a first product signal, a second multiplier receiving said second differentiated signal and said second summed signal to provide a second product signal, means to invert the polarity of said second product signal, fourth means to sum said first product signal and said inverted second product signal to provide a fourth summed signal and means to integrate said fourth summed signal to provide a demodulated output signal.

3. A system for demodulating light as described in claim 2 wherein said first, second and third multipliers provide an electrical output proportional to the power of the light incident upon them and hence proportional to the square of the field intensity.

References Cited by the Examiner

UNITED STATES PATENTS

| | | | |
|---|---|---|---|
| 2,531,951 | 11/1950 | Shamos et al. | 250—199 |
| 3,134,840 | 5/1964 | Gamo. | |
| 3,175,088 | 3/1965 | Herriott | 250—199 |
| 3,214,590 | 10/1965 | Schactman | 250—199 |

DAVID G. REDINBAUGH, *Primary Examiner.*

JOHN W. CALDWELL, *Assistant Examiner.*